United States Patent
Esbensen et al.

(10) Patent No.: US 9,822,764 B2
(45) Date of Patent: Nov. 21, 2017

(54) SYSTEM FOR AUTOMATIC POWER ESTIMATION ADJUSTMENT

(71) Applicant: Siemens Aktiengesellschaft, Munich (DE)

(72) Inventors: Thomas Esbensen, Herning (DK);
Ramakrishnan Krishna, Skjern (DK);
Frank Scheurich, Herning (DK);
Michael Stoettrup, Herning (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 569 days.

(21) Appl. No.: 14/506,658

(22) Filed: Oct. 5, 2014

(65) Prior Publication Data
US 2015/0097373 A1 Apr. 9, 2015

(30) Foreign Application Priority Data

Oct. 9, 2013 (EP) .................................... 13187918

(51) Int. Cl.
*F03D 7/04* (2006.01)
*F03D 7/00* (2006.01)
(Continued)

(52) U.S. Cl.
CPC ................. *F03D 7/04* (2013.01); *F03D 7/00* (2013.01); *F03D 9/257* (2017.02);
(Continued)

(58) Field of Classification Search
None
See application file for complete search history.

(56) References Cited

U.S. PATENT DOCUMENTS

| | | | |
|---|---|---|---|
| 2010/0237617 A1* | 9/2010 | Vyas | F03D 7/043 290/44 |
| 2012/0078518 A1 | 3/2012 | Krishna | |

(Continued)

FOREIGN PATENT DOCUMENTS

| | | |
|---|---|---|
| DE | 102011083178 A1 | 3/2013 |
| EP | 2522851 A2 | 11/2012 |

(Continued)

*Primary Examiner* — Qing Wu
(74) *Attorney, Agent, or Firm* — Beusse Wolter Sanks & Maire

(57) ABSTRACT

An automatic adjustment system for a variable-speed wind turbine is provided, having a power vector generator for generating a power vector ($P_{vec}$) of wind turbine output power; a mapping unit for establishing relationships ($\beta_{vec}$, $\omega_{vec}$) between wind turbine output power and rotational speed and pitch angle on the basis of the power vector ($P_{vec}$) and an operational trajectory of the wind turbine; a wind speed estimator for estimating a wind speed ($v_{est}$); an available power calculator for calculating the available power ($P_{est}$) of the wind turbine on the basis of the estimated wind speed ($v_{est}$) and the established relationships ($\beta_{vec}$, $\omega_{vec}$). A method of performing automatic analysis of a wind turbine configuration, a computer program product for carrying out the steps of such a method, and a wind turbine having such an automatic adjustment system are also provided.

15 Claims, 4 Drawing Sheets

(51) Int. Cl.
*H02P 9/04* (2006.01)
*F03D 9/25* (2016.01)

(52) U.S. Cl.
CPC .......... *F05B 2260/821* (2013.01); *H02P 9/04* (2013.01); *Y02E 10/723* (2013.01); *Y02E 10/725* (2013.01)

(56) References Cited

U.S. PATENT DOCUMENTS

2013/0015662 A1 1/2013 Bertolotti
2014/0186177 A1 7/2014 Bohme

FOREIGN PATENT DOCUMENTS

| EP | 2604853 A1 | 6/2013 |
| WO | 2007123552 A1 | 11/2007 |
| WO | 2011120729 A2 | 10/2011 |

* cited by examiner

SYSTEM FOR AUTOMATIC POWER ESTIMATION ADJUSTMENT

CROSS REFERENCE TO RELATED APPLICATIONS

This application claims priority to and the benefit of European Application No. EP13187918 filed Oct. 9, 2013, incorporated by reference herein in its entirety.

FIELD OF INVENTION

The invention describes an automatic adjustment system for a variable-speed wind turbine, a method of performing automatic adjustment of an available power estimation of a variable-speed wind turbine; a computer program product; and a wind turbine.

BACKGROUND OF INVENTION

The wind turbines of a wind park can be operated at a reduced power set-point to ensure a satisfactory balance between the power being delivered by the wind turbines to the electricity network and the power being consumed in the electricity network. The reduced power set-point avoids a situation in which the wind turbines would collectively generate more power than is consumed in the electricity network or grid, which would result in an undesirable increase in frequency of the generated power. Such a reduced power set-point may be stipulated in a grid code. However, wind turbine revenue is generally based on the power that could be delivered by the wind turbine to the grid, i.e. the "available power" of that wind turbine, i.e. the wind turbine revenue may not necessarily be based on the power that is in fact delivered by the wind turbine to the grid. The available power is the power that could be generated by the wind turbine under the prevailing conditions. The most important of these is the current wind speed, since this governs the rotational velocity of the wind turbine's rotor.

Usually, a wind park or even a wind turbine is equipped with one or more wind speed measuring devices such as an anemometer. The measured wind speed is used as the basis from which the available power is estimated. Usually, this is done by consulting a power curve table previously generated in a calibration procedure for that wind turbine type. However, the estimation of available power may be quite imprecise, since it is difficult to measure wind speed over the rotor plane with any degree of accuracy. Wind gusts and turbulence (particularly in the case of a wind turbine that is downstream from another wind turbine) result in poor quality wind speed measurements. Furthermore, even if an anemometer is located directly on a wind turbine, for example on its nacelle, it may not be able to provide an exact measurement for the wind speed at that turbine. For example, if the anemometer is located downwind of the rotor plane, its measured wind speed will be different from the wind speed in the rotor plane, but it is the wind speed over the entire rotor plane that is relevant regarding the amount of power available in the wind.

In another approach, instead of measuring the wind speed using a device such as an anemometer and using the wind speed to determine the available power, the power being generated by the wind turbine can be used to deduce the actual wind speed. From this, the available power can be estimated. However, such an adjustment procedure is complex, and takes some time to be carried out. Furthermore, since this approach requires manual intervention and because many factors must be considered, it is relatively easy for errors to accumulate, resulting in a sub-optimal control of the wind turbine.

Another problem can arise when the control of a wind turbine is adjusted to reduce the level of noise, particularly the aerodynamic noise caused by the rotor blades. If the rotational velocity is reduced on the basis of an incorrect estimated wind speed value, the wind turbine may be operated at a low level of efficiency as a result.

SUMMARY OF INVENTION

It is therefore an object of the invention to provide an improved way of reliably estimating the available power, which avoids the problems mentioned above.

This object is achieved by an automatic adjustment system; by a method of performing an automatic adjustment of a power estimation value; by a computer program product; and by a wind turbine as claimed.

According to aspects of the invention, an automatic adjustment system for a variable-speed wind turbine comprises a power vector generator for generating a power vector of wind turbine output power; a mapping unit for establishing relationships between wind turbine output power and rotational speed and pitch angle on the basis of the power vector and an operational trajectory of the wind turbine; a wind speed estimator for estimating a wind speed; and an available power calculator for calculating the available power of the wind turbine on the basis of the estimated wind speed and the established relationships.

An advantage of the automatic adjustment system according to aspects of the invention is that it makes possible the calculation of an up-to-date and accurate estimation of the available power, i.e. the power that the wind turbine is capable of delivering under the current operating conditions. In this way, the estimation of available power can be adjusted automatically, at any time, and in response to any stimulus, but without any user intervention. For example, the automatic adjustment system can report, at any time, an up-to-date available power value for the current wind speed, which may also take into consideration any changes in operating parameters such as a deliberate alteration in rotational speed of the wind turbine's rotor.

According to aspects of the invention, a method of performing automatic adjustment of the estimated wind turbine power curve comprises the steps of generating a power vector of wind turbine output power; establishing relationships between wind turbine output power and rotational speed and pitch angle on the basis of the power vector and an operational trajectory of the wind turbine; estimating a wind speed; and adjusting an estimate of available power of the wind turbine on the basis of the estimated wind speed and the established relationships. The method according to aspects of the invention is characterized in that the steps are performed without any necessary human interaction.

An advantage of the method according to aspects of the invention is that an estimation of the available power can quickly and reliably be adjusted or re-calculated at essentially any time, without an operator having to assess the relevance of any alteration in a factor such as a change in the momentary wind speed, a change in the rotational speed on account of noise levels, etc. Up-to-date knowledge about the available power is becoming more relevant since the acceptable estimation error of various grid codes is being reduced.

According to aspects of the invention, a computer program product is capable of carrying out the steps of such a method when loaded into a memory of a programmable device of a wind turbine.

An advantage of the computer program product according to aspects of the invention is that it can be run on any suitable device, and can deliver up-to-date information quickly and reliably, at any time of day, and without being susceptible to error. For example, the programmable device may comprise a computer that is part of a wind park control system, so that the steps of the method can be carried out in parallel for a plurality of wind turbines. Equally, the programmable device may comprise a computer such as the main computer of a wind turbine, so that the steps of the method can be carried out locally in a wind turbine, and the results of any computation can be used directly to control that wind turbine, and/or may be reported to a wind park operator.

According to aspects of the invention, the wind turbine comprises such an automatic adjustment system, so that it can always determine how much power it would be able to deliver under the prevailing circumstances. For example, even if the wind turbine is down-regulated for a certain reason (for example as stipulated by the applicable grid code), it can provide an accurate and up-to-date estimate of the power that it is capable of providing.

Particularly advantageous embodiments and features of the invention are given by the dependent claims, as revealed in the following description. Features of different claim categories may be combined as appropriate to give further embodiments not described herein.

A variable-speed wind turbine can be controlled to alter the blade pitch angles of its rotor blades (usually three blades arranged in a rotor plane), so that more wind energy can be captured by the wind turbine and converted to electrical energy. In the following, without restricting the invention in any way, it may be assumed that the wind turbine is a variable-speed wind turbine. Furthermore, it may be assumed that the variable-speed wind turbine is operated, or can be operated, in a down-regulated manner, i.e. so that it is throttled to deliver less power than it is actually capable of delivering. The reasons for throttling a wind turbine in this manner have been given in the introduction.

Unless otherwise indicated, the word "current" is to be understood in a temporal context, for example the term "current power" should be understood to mean "the power at that instant", the term "current wind speed" means "the wind speed at this time", etc.

In a first step of the method according to aspects of the invention, the power vector is compiled, i.e. "put together", comprising values of power at step size intervals. Preferably, the step size is relatively small, for example the power vector may be compiled in step sizes of 100 kW, so that the power vector might comprise the kW (kilowatt) power values 0, 100, 200, ..., etc. up to a value of rated power, and possibly extending beyond this, for example up to a value of 110% of rated power. A power vector for a 3.6 MW wind turbine can comprise the values 0, 100, 200, ..., 3500, 3600, 3700 kW. Of course, the "points" in the power vector need not be equidistant, and the interval size between points can be chosen as required.

The operational trajectory of a wind turbine may need to be altered at any time on account of various factors. For example it may be necessary to operate a wind turbine to reduce its noise levels at night or on certain days. Similarly, depending on the wind direction, it may be necessary to reduce the noise levels of one or more wind turbines of a wind park that are close to an inhabited region. Noise levels can be reduced, for example, by altering the pitch angle of the rotor blades of a wind turbine.

In a second step of the method according to aspects of the invention, as mentioned above, relationships between wind turbine output power and rotational speed and pitch angle are established on the basis of the power vector and an operational trajectory of the wind turbine. Therefore, in a preferred embodiment, the automatic adjustment system preferably comprises a memory module for storing a pitch curve for that wind turbine, wherein a pitch curve defines a relationship between blade pitch angle and power output for that wind turbine; and a speed/power curve defining a relationship between rotational speed and power for that wind turbine.

Preferably, in order to be able to determine the available power of a wind turbine, the automatic adjustment system according to the invention is provided with a value of the power actually being generated by that wind turbine. For example, a value of "wind turbine output power" can be provided by the main computer of the wind turbine in the form of a digital signal. The automatic adjustment system according to the invention is provided with a value of the rotational velocity of the wind turbine's rotor. The rotational speed can be measured by any suitable measuring device such as a sensor arrangement in the hub. A current value of "wind turbine rotational velocity" can be provided to the automatic adjustment system by such a sensor in the form of a digital signal. The measuring device can be configured or realised to deliver a rotational velocity value at regular intervals or as required. Similarly, the automatic adjustment system according to the invention is also provided with a value of the blade pitch angle.

In a subsequent step of the method according to aspects of the invention, the wind speed is estimated on the basis of the power vector and the established relationships. To this end, in a preferred embodiment of the invention, the automatic adjustment system according to the invention preferably also comprises a memory module for storing a Cp matrix, i.e. number of Cp curves or rpm/pitch data sets, wherein a Cp curve or rpm/pitch data set defines a relationship between a rotational velocity of the wind turbine rotor and a pitch angle of the rotor blades for a specific power value and a specific wind speed value. A "Cp matrix" is effectively a collection of Cp curves, where Cp refers a coefficient of power and can be used to give an indication of the efficiency with which the wind turbine is operating. For a certain wind speed value, the output power that is delivered for reasonable combinations of pitch angle and rotor velocity can be plotted as a set of Cp curves in the form of "contour lines" or "isoclines". Several such data sets established for several values of wind speed (for example 6 ms$^{-1}$, 7 ms$^{-1}$, 8 ms$^{-1}$ etc.) may be referred to as a "power matrix" in the following. In a further preferred embodiment of the invention, therefore, a wind vector is compiled, comprising values of wind speed at appropriate intervals. Preferably, the step size is relatively small, for example the wind vector may be compiled in step sizes of 1.0 ms$^{-1}$, so that the wind vector might comprise values of wind speed at intervals of 1.0 ms$^{-1}$ up to maximum wind speed at which the wind turbine would have to be halted.

A relevant Cp curve in the matrix is identified that best applies to the values of rotational velocity, blade pitch angle and actual power. This Cp curve then provides an accurate estimate of the actual wind speed, since the observed combination of values for rotational velocity, blade pitch angle and actual power will only suit a certain wind speed (within a reasonable tolerance margin). For example, for certain observed values of rotational velocity, blade pitch angle and actual power, the Cp matrix associated with 10.25 ms$^{-1}$ may be identified. This means that the current wind speed is close to 10.25 ms$^{-1}$. The wind speed estimator effectively estimates a current wind speed on the basis of measured values of produced active power, rotational speed and pitch angle. This is in contrast to conventional methods in which the wind speed might be measured using some physical device such as a cup anemometer, sonic anemometer, etc. Estimation of the wind speed on the basis of the power vector has been found to be significantly more accurate than measurements using anemometers. Knowledge of the relationship between the power actually being output or delivered by the wind turbine and the applicable rpm and pitch angle allows a favourably accurate estimation to be made about the current wind speed.

Using the estimated wind speed and the power curve, the available power calculator can adjust the estimate of available power of the wind turbine. In order to estimate the available power it is necessary to know how much power the turbine can produce at any given wind speed. As indicated above, the amount of power a turbine can produce depends on the configuration of the turbine's operational trajectory. Based on this information, it is possible to generate a configuration-dependent power curve for that wind turbine, relating the maximum possible power that can be output by the wind turbine as a function of wind speed.

The automatic adjustment system according to aspects of the invention preferably also comprises a memory module for storing a current or up-to-date power curve for that wind turbine, wherein a power curve defines a relationship between wind speed and the power that could possibly be output at each value of wind speed. The power curve can be updated whenever there is a change in an input parameter, for example whenever a blade pitch angle is adjusted, or whenever the rotational velocity of the rotor changes. Here, the term "curve" is to be understood as a set of value pairs, which, taken together, could be rendered as a curve. In the memory module, however, the data can simply be stored as one or more lists of wind speed and power output value pairs. With the estimated wind speed value, the available power can be determined by "reading" the corresponding value from the power curve, whereby an interpolation may be carried out if necessary.

An updated estimation of the available power can be generated at regular intervals, for example every 5 minutes, every half hour, or at any suitable rate. Alternatively or in addition, in a preferred embodiment of the invention, the step of estimating the available power is automatically performed in the event of an alteration in an operational trajectory of the wind turbine.

All of the above steps are performed without any human interaction, so that a controller of a wind turbine or wind park can always deliver up-to-date vales of estimated available power without the need for any human input.

In a further embodiment of the invention, the available power is calculated at predefined regular intervals. For example, the operator of a wind park may consider it important to be provided with an automatic estimation of the available power every second, every minute, every hour, etc. This rate may depend on the requirements laid down by a Transmission System Operator (TSO).

Of course, instead of only carrying out the available power estimation at regular fixed intervals, in a further embodiment of the method according to aspects of the invention, the available power may be calculated automatically in response to an alteration in a relevant variable. For example, whenever there is a change in the value of estimated wind speed, this can trigger a re-calculation of the available power. Similarly, whenever a parameter is changed because of some external requirement, resulting in a change in the power curve, this also can trigger a re-calculation of the available power.

Separate memory modules could be used for the various data sets mentioned above, but it should be clear that a single memory module could be used for the power curve, the pitch curve and the rpm/pitch data, and it is to be understood that the data is simply stored in such a way that it can easily be retrieved by the computer program that carries out the steps of the method.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

Figure 1:
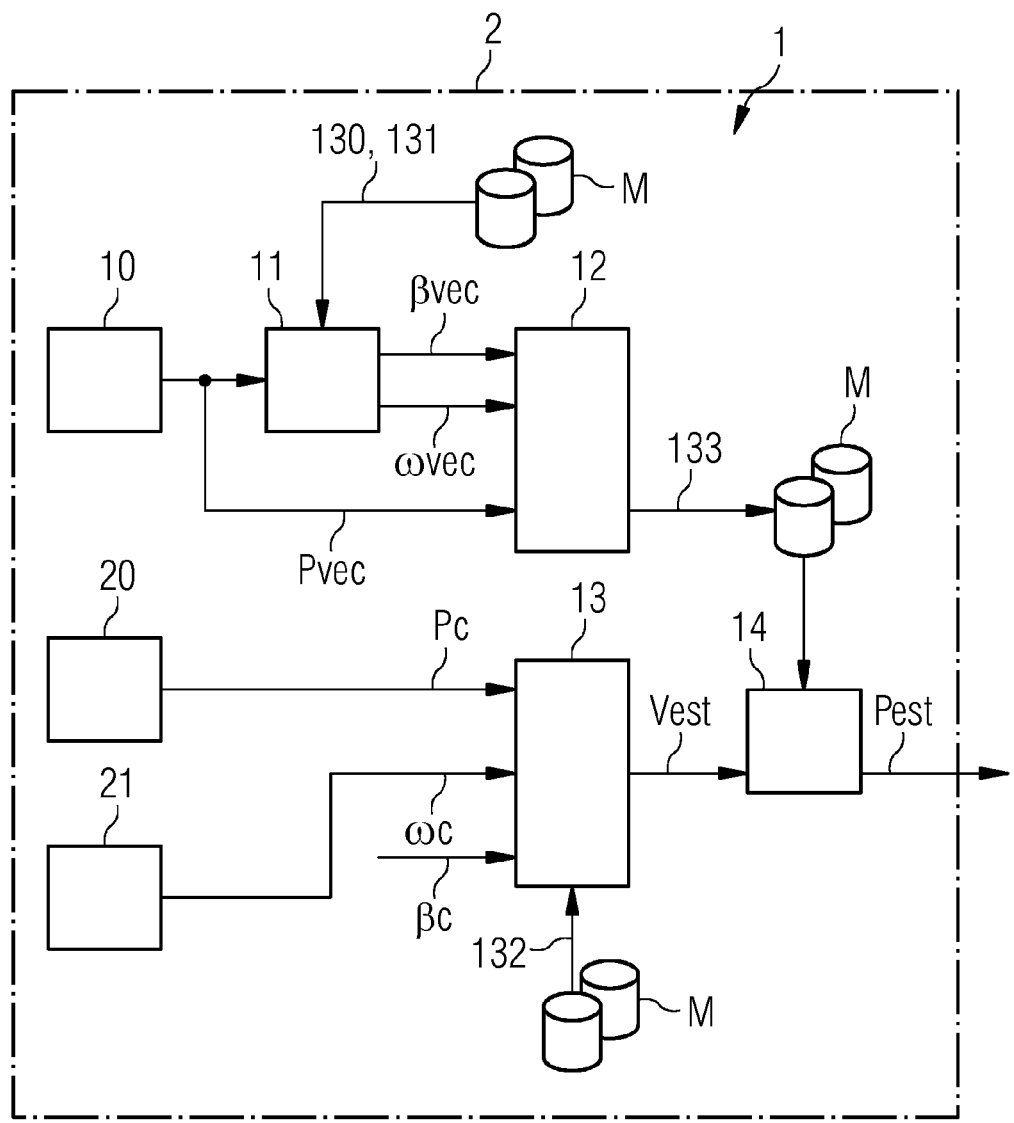
FIG. 1 shows a block diagram of an automatic adjustment system according to an embodiment of the invention.

FIG. 1 shows a block diagram of an automatic adjustment system 1, for the automatic estimation of available power, according to an embodiment of the invention. This is shown as part of a wind turbine 2, for example the automatic adjustment system 1 can be realised as one or more modules of a computer program to be run on a processor or computer of the wind turbine 2. In this exemplary embodiment, the automatic adjustment system 1 comprises various memory modules M for storing data relating to the wind turbine 2. Here, the memory modules M store one or more speed/power curves, pitch curves, rpm/pitch data sets, and power curves.

The automatic adjustment system 1 comprises a power vector generator 10 for generating a power vector $P_{vec}$ of the wind turbine 2. The power vector $P_{vec}$ is forwarded to a mapping block 11 or look-up block 11 realised to interpret one or more speed/power curves 130 and pitch curves 131 to determine a pitch vector $\beta_{vec}$ comprising a set of values corresponding to the points of the power vector $P_{vec}$, i.e. the pitch vector $\beta_{vec}$ comprises a set of points, whereby each point is a matching value of pitch for each point in the power vector $P_{vec}$. Similarly, the mapping block 11 outputs a rotational speed vector $\omega_{vec}$ for that power vector $P_{vec}$. The pitch and rotational speed vectors $\beta_{vec}$, $\omega_{vec}$ in turn are used by power curve compilation unit 12 that compiles a power curve 133 relating maximum output power to various wind speed values, for example points in a wind speed vector. The wind speed vector and the power vector $P_{vec}$ together define the power curve 133 for that wind turbine 2.

The automatic adjustment system 1 comprises a wind speed estimator 13 which estimates the wind speed $v_{est}$ on the basis of a power matrix 132 for that wind turbine 2. The estimated wind speed $v_{est}$ is forwarded to an available power look-up table 14 realised to determine the available power $P_{est}$ of the wind turbine 2 on the basis of the estimated wind speed $v_{est}$.

The automatic adjustment system 1 can be provided with up-to-date operational values $P_c$, $\beta_c$, $\omega_c$ of the wind turbine 2, such as the power $P_c$ that is currently being output by the wind turbine 2, the blade pitch angle $\beta_c$, the rotational velocity $\omega_c$ of the rotor, etc. Such information can be provided by a main computer 20, which generally records all relevant operating parameters of the wind turbine 2. Equally, a sensor such as a rotational speed sensor 21 might be used to provide values of current rotational velocity $\omega_c$ of the rotor. Of course, even though the main computer 20 is shown here as a separate block, the automatic adjustment system 1 could itself be realised as a computer program product to run on the main computer 20 of the turbine, or on a computer of a wind park controller, etc.

The estimated available power value $P_{est}$ can be forwarded to a suitable target, for example an operator or a wind park controller, which can record the information or evaluate it. The estimated available power value $P_{est}$ can be used to calculate the revenue for that wind turbine 2, and/or can be used to regulate the operation of the wind turbine 2 in a more efficient manner.

Figure 2:
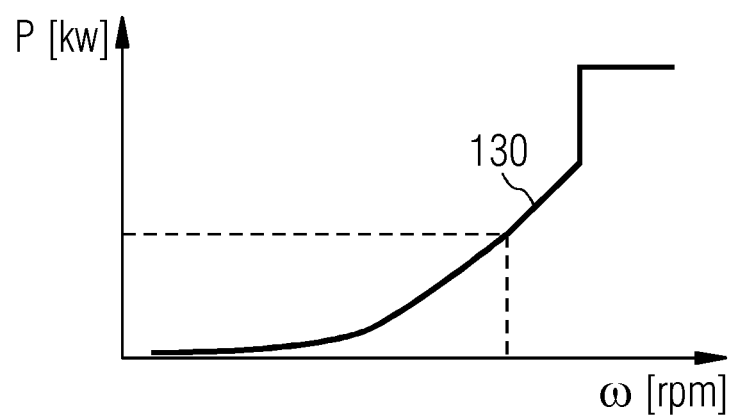
FIG. 2 shows a speed/power curve for a wind turbine.

FIG. 2 shows a speed/power curve 130 for a wind turbine. This shows the configured relationship between rotational velocity $\omega$ [rpm] of the wind turbine's rotor and the power P [kW]. This information establishes the relationship between power and rotational speed in used by block 11 of the automatic adjustment system 1 of FIG. 1.

Figure 3:
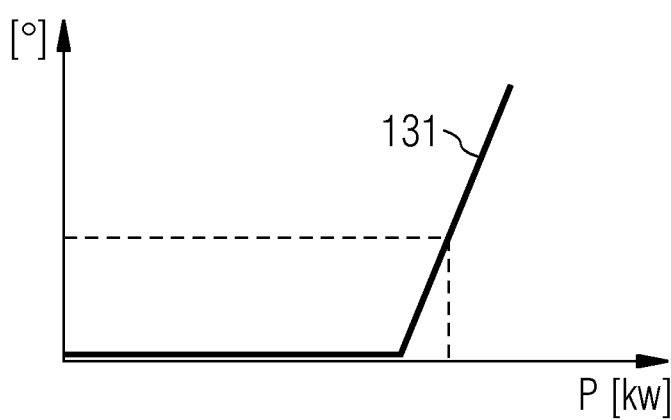
FIG. 3 shows a pitch curve for a wind turbine.

FIG. 3 shows a pitch curve 131 for a wind turbine. This shows the configured relationship between power P [kW] and pitch angle $\beta$ [°]. This information is used by the automatic adjustment system 1 of FIG. 1.

Taken in combination, the information presented in FIGS. 2 and 3 is the "configured operational trajectory" of the wind turbine. Values of rotational velocity and pitch angle are effectively tied to values of output power of the wind turbine. The rotational speed of the blades may be altered, for example, as a result of a change in wind speed and/or because of a need to comply with noise regulations. The blade pitch angle may be altered, for example in order to increase or decrease rotor torque and/or because of a need to comply with noise regulations.

Figure 4:
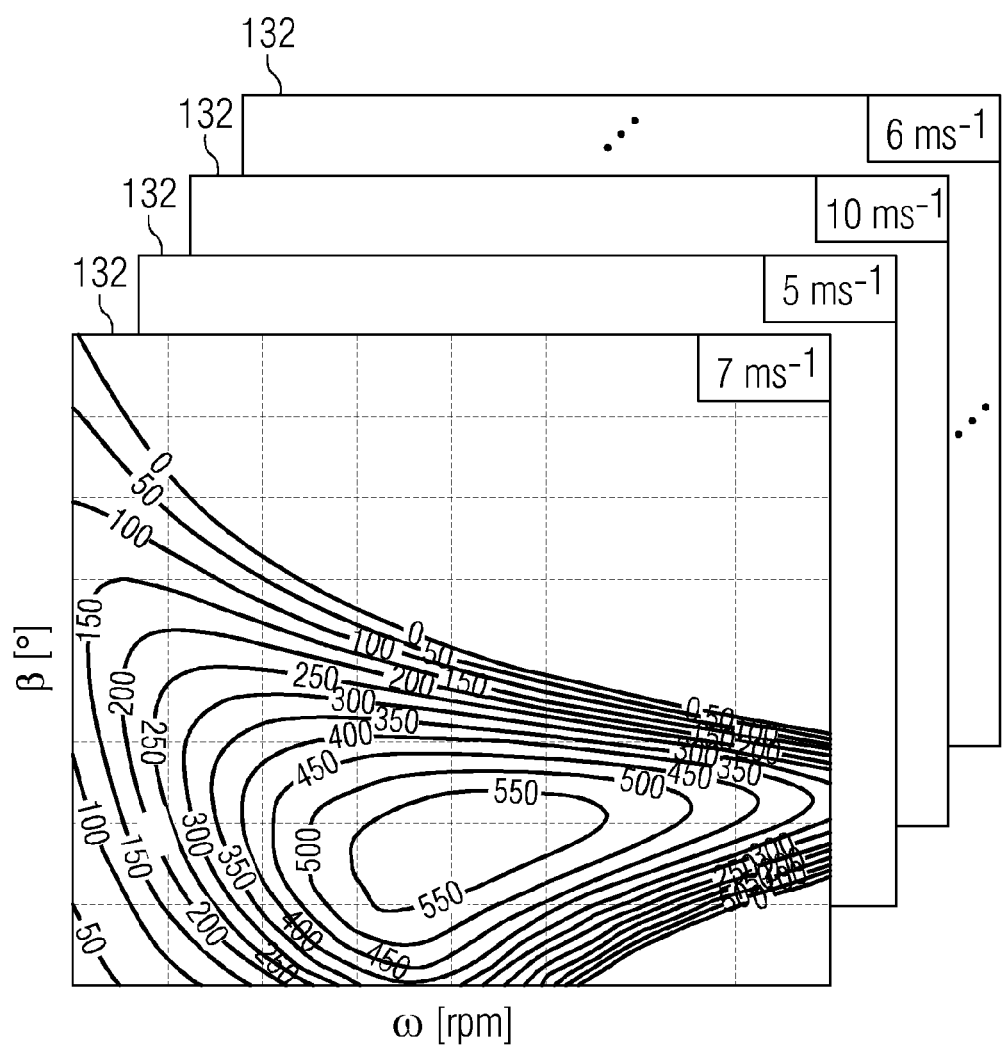
FIG. 4 shows an rpm/pitch data set for a wind turbine.

FIG. 4 shows the power matrix or "Cp matrix" as rpm, pitch, wind speed data sets 132 for a wind turbine. For each value of wind speed (exemplary values are shown in the upper right corner of each "data set" 132), the influence of pitch angle $\beta$ [°] and rotor rotational velocity w [rpm] on the current value of output power is shown as a set of Cp curves. Each "contour line" represents a certain output power value. For example, for the Cp curves at the front of the stack, the output power at a wind speed of 7 m/s is plotted for all reasonable combinations of pitch angle $\beta$ and rotor rotational velocity. The information presented by the Cp curves for a wind turbine can have been previously collected in a calibration step or calculated based on models.

The wind speed estimator 13 of FIG. 1 applies the information it has received i.e. measured values of power $P_c$, pitch angle $\beta_c$ and the rotational speed $\omega_c$ to determine an accurate estimation of the momentary wind speed $v_{est}$. For example, the wind speed estimator 13 may have identified the Cp curve shown at the front of the stack, and may have concluded that the current wind speed must be 7 m/s. This estimated wind speed $v_{est}$ can then be used by the available power look-up table 14 to obtain an estimation of the available output power $P_{est}$.

Of course, rpm/pitch data sets could be compiled or collected during normal operation of the wind turbine, and the method according to the invention can be implemented once sufficient quantities of data have been collected for output power, rotational velocity, pitch and wind speed values.

Figure 5:
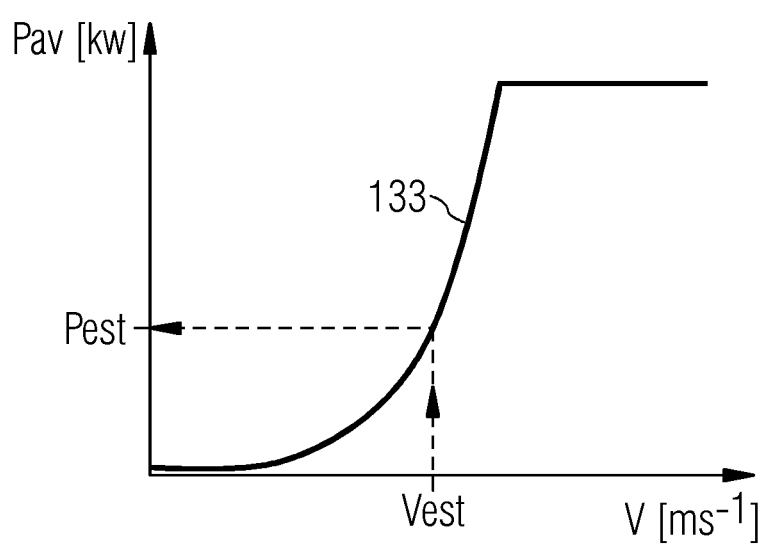
FIG. 5 shows a power curve for a wind turbine;
In the diagrams, like numbers refer to like objects throughout. Objects in the diagrams are not necessarily drawn to scale.

FIG. 5 shows a power curve for a wind turbine. This shows the relationship between wind speed v [ms$^{-1}$] and available power $P_{av}$ [kW]. For example, with a reliable estimate of the current wind speed $v_{est}$, it is possible to determine, with a corresponding high level of accuracy, an accurate estimate of the available power $P_{est}$ that the wind turbine is capable of producing under the current conditions. With this information, it is possible to more accurately compute the available power for that wind turbine.

As already mentioned in the above, the "curves" and data sets are stored in a digital manner in a memory module, and are only shown as plotted curves in the above for the sake of illustration. The skilled person will appreciate that such "curves" are generally stored as value pairs, and that points between adjacent value pairs can be determined by applying a suitable interpolation algorithm. Similarly, the method according to the invention can automatically interpolate between adjacent Cp curves in a stack, if it concludes that the current wind speed lies between the wind speeds of two candidate Cp curves.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An automatic adjustment system for a variable-speed wind turbine, which automatic adjustment system comprises a controller including:
   a power vector generator for generating a power vector of wind turbine output power;
   a mapping unit for establishing relationships between wind turbine output power and rotational speed and pitch angle on the basis of the power vector and an operational trajectory of the wind turbine;
   a wind speed estimator for estimating a current wind speed based on measured values of produced active power, the rotational speed and the pitch angle; and
   an available power calculator for adjusting an estimate of available power of the wind turbine on the basis of the estimated wind speed and the established relationships;
   wherein the controller to regulate the wind turbine in response to the estimated available power including control of the pitch angle of rotary blades of the wind turbine.

2. The automatic adjustment system according to claim 1, further comprising
   a memory module for storing a Cp matrix, wherein the Cp matrix defines a relationship between a rotational velocity of a wind turbine rotor, the pitch angle of the rotor blades, a power value and a wind speed value.

3. The automatic adjustment system according to claim 1, further comprising a memory module for storing a power curve for that wind turbine, wherein the power curve defines a relationship between wind speed and maximum power output for the wind turbine.

4. The automatic adjustment system according to claim 1, further comprising
a memory module for storing a pitch curve and a speed/power curve for the wind turbine, wherein the pitch curve defines the relationship between the pitch angle and the output power for the wind turbine, and the speed/power curve defines the relationship between the rotational speed and the output power for the wind turbine.

5. The automatic adjustment system according to claim 1, further comprising
a power value input for providing a current power value for the wind turbine.

6. The automatic adjustment system according to claim 1, further comprising
a rotational velocity input for providing a current rotational velocity value for the wind turbine.

7. A wind turbine comprising an automatic adjustment system according to claim 1.

8. A method, comprising:
generating, by a controller, a power vector of wind turbine output power;
establishing, by the controller, relationships between wind turbine output power and rotational speed and pitch angle on the basis of the power vector and an operational trajectory of the wind turbine;
estimating, by the controller, a wind speed based on measured values of produced active power, the rotational speed and the pitch angle;
adjusting, by the controller, an estimate of available power of the wind turbine on the basis of the estimated wind speed and the established relationships; and
regulating, by the controller, the wind turbine in response to the estimated available power including control of the pitch angle of rotary blades of the wind turbine.

9. The method according to claim 8, wherein the step of generating the power vector is automatically performed in the event of an alteration in the operational trajectory of the wind turbine.

10. The method according to claim 8, wherein the power vector is computed with a fixed step size.

11. The method according to claim 8, wherein the estimated available power is adjusted at predefined regular intervals.

12. The method according to claim 8, wherein the estimated available power is adjusted in response to an alteration in the estimated wind speed.

13. The method according to claim 8, wherein the power vector comprises a step size interval of at most 100 kW.

14. The method according to claim 8, wherein the power vector extends beyond a value of rated power of the wind turbine.

15. A computer readable memory having a computer program product stored thereon which when executed causes a processor to:
generate a power vector of wind turbine output power;
establish relationships between wind turbine output power and rotational speed and pitch angle on the basis of the power vector and an operational trajectory of a wind turbine;
estimate a wind speed based on measured values of produced active power, the rotational speed and the pitch angle;
adjust an estimate of available power of the wind turbine on the basis of the estimated wind speed and the established relationships; and
regulate the wind turbine in response to the estimated available power including control of the pitch angle of rotary blades of the wind turbine.

* * * * *